United States Patent
Falkner et al.

(10) Patent No.: US 12,539,024 B2
(45) Date of Patent: Feb. 3, 2026

(54) MEDICAL DEVICE FOR FEMALE REPRODUCTIVE HEALTH AND METHOD OF USE

(71) Applicant: InnoMed Five, LLC, Mobile, AL (US)

(72) Inventors: Peter T. Falkner, Mobile, AL (US); Kirby J. Plessala, Mobile, AL (US); Marshall Walker, Mobile, AL (US); John Krumme, Bainbridge Island, WA (US)

( * ) Notice: Subject to any disclaimer, the term of this patent is extended or adjusted under 35 U.S.C. 154(b) by 0 days.

(21) Appl. No.: 18/024,069

(22) PCT Filed: Sep. 3, 2021

(86) PCT No.: PCT/US2021/049087
§ 371 (c)(1),
(2) Date: Mar. 1, 2023

(87) PCT Pub. No.: WO2022/051637
PCT Pub. Date: Mar. 10, 2022

(65) Prior Publication Data
US 2023/0277045 A1 Sep. 7, 2023

Related U.S. Application Data

(60) Provisional application No. 63/136,338, filed on Jan. 12, 2021, provisional application No. 63/123,694, (Continued)

(51) Int. Cl.
*A61B 1/015* (2006.01)
*A61B 1/00* (2006.01)
(Continued)

(52) U.S. Cl.
CPC ......... *A61B 1/015* (2013.01); *A61B 1/00052* (2013.01); *A61B 1/00066* (2013.01);
(Continued)

(58) Field of Classification Search
CPC ...... A61B 17/42–435; A61B 17/32056; A61B 1/015; A61B 1/303
See application file for complete search history.

(56) References Cited

U.S. PATENT DOCUMENTS

| | | |
|---|---|---|
| 3,796,211 A | 3/1974 | Kohl |
| 3,811,443 A | 5/1974 | Oakes et al. |
| | (Continued) | |

FOREIGN PATENT DOCUMENTS

| | | |
|---|---|---|
| CN | 201029975 Y | 3/2008 |
| CN | 203029423 U | 7/2013 |
| | (Continued) | |

OTHER PUBLICATIONS

Summary of Gunther et al., "Endometriales Scratching". Gynecological Endocrinology. vol. 15, pp. 287-291. Sep. 1, 2027. pp. 1-3.

*Primary Examiner* — Thaddeus B Cox
(74) *Attorney, Agent, or Firm* — John S. Sears; Lex Generalis, LLC

(57) ABSTRACT

A single, handheld medical device for performing an endometrial abrasion and/or HSG procedure is disclosed. The preferred embodiment comprises a body that includes a handle integrally connected to an arm with an articulating member at its distal end. The handle comprises a means for storing and pumping a fluid into the uterus so that ultrasound or x-ray can be used to determine the location of the articulating member within the uterus. The arm further comprises a shielding device that is operable to slidably engage the arm of the device and the shield and the arm are configured to cover and sealingly engage the external os of the cervix to prevent reflux during use. Optional viewing means are disclosed, including an imaging screen mountably attached to the device and in communication with a scope disposed within the arm.

10 Claims, 17 Drawing Sheets

Related U.S. Application Data filed on Dec. 10, 2020, provisional application No. 63/110,544, filed on Nov. 6, 2020, provisional application No. 63/074,096, filed on Sep. 3, 2020.

(51) Int. Cl.

| | |
|---|---|
| *A61B 1/005* | (2006.01) |
| *A61B 1/05* | (2006.01) |
| *A61B 1/303* | (2006.01) |
| *A61B 17/42* | (2006.01) |
| *A61M 31/00* | (2006.01) |

(52) U.S. Cl.
CPC .............. *A61B 1/0058* (2013.01); *A61B 1/05* (2013.01); *A61B 1/303* (2013.01); *A61B 2017/4216* (2013.01); *A61M 31/005* (2013.01)

(56) References Cited

U.S. PATENT DOCUMENTS

| | | | |
|---|---|---|---|
| 4,319,563 | A | 3/1982 | Kubota |
| 4,322,463 | A | 3/1982 | Goepp et al. |
| 4,585,438 | A | 4/1986 | Makler |
| 5,037,431 | A | 8/1991 | Summers et al. |
| 5,195,964 | A | 3/1993 | Kletzky et al. |
| 5,209,238 | A | 5/1993 | Sundhar |
| 5,476,104 | A | 12/1995 | Sheahon |
| 5,536,243 | A | 7/1996 | Jeyendran |
| 5,624,399 | A | 4/1997 | Ackerman |
| 5,807,239 | A | 9/1998 | DiBernardo |
| 5,810,861 | A | 9/1998 | Gaber |
| 5,928,249 | A | 7/1999 | Saadat et al. |
| 5,935,098 | A | 8/1999 | Blaisdell et al. |
| 6,129,214 | A | 10/2000 | Bar-Ami et al. |
| 6,491,645 | B1 | 12/2002 | Gaber |
| 6,511,415 | B1 | 1/2003 | Christine et al. |
| 6,610,005 | B1 | 8/2003 | Tao |
| 6,773,418 | B1 | 8/2004 | Sharrow et al. |
| 8,734,364 | B1 | 5/2014 | Mantzaris et al. |
| 8,747,414 | B2 | 6/2014 | Grillo |
| 11,478,274 | B2 | 10/2022 | Plessala et al. |
| 11,883,073 | B2 | 1/2024 | Plessala et al. |
| 11,931,075 | B2 | 3/2024 | Westphal et al. |
| 2002/0007222 | A1 | 1/2002 | Desai |
| 2002/0010457 | A1 | 1/2002 | Duchon |
| 2002/0022870 | A1 | 2/2002 | Truckai et al. |
| 2003/0018238 | A1* | 1/2003 | Obata ................ A61B 1/12 600/179 |
| 2004/0162461 | A1 | 8/2004 | Christine et al. |
| 2004/0225187 | A1 | 11/2004 | Kamrava et al. |
| 2005/0222601 | A1 | 10/2005 | Erhard |
| 2006/0089608 | A1 | 4/2006 | Shaykh et al. |
| 2006/0183973 | A1 | 8/2006 | Kamrava |
| 2008/0039864 | A1 | 2/2008 | Feuer et al. |
| 2008/0051631 | A1 | 2/2008 | Dejima et al. |
| 2008/0132763 | A1* | 6/2008 | Isaacson ............ A61M 3/0201 600/158 |
| 2008/0249364 | A1 | 10/2008 | Korner |
| 2008/0249552 | A1 | 10/2008 | Eliachar et al. |
| 2009/0024085 | A1 | 1/2009 | To et al. |
| 2010/0137687 | A1 | 6/2010 | Schwartz et al. |
| 2010/0270354 | A1 | 10/2010 | Rimer et al. |
| 2011/0152606 | A1 | 6/2011 | Bollinger |
| 2011/0230875 | A1 | 9/2011 | Walberg et al. |
| 2011/0282382 | A1 | 11/2011 | McAlister et al. |
| 2012/0074200 | A1 | 3/2012 | Schmid et al. |
| 2012/0078377 | A1 | 3/2012 | Gonzales et al. |
| 2012/0316460 | A1 | 12/2012 | Stout |
| 2013/0144125 | A1 | 6/2013 | Konstorum |
| 2013/0338533 | A1 | 12/2013 | Olsen |
| 2014/0200591 | A1 | 7/2014 | Sullivan et al. |
| 2014/0276726 | A1 | 9/2014 | Model |
| 2014/0309488 | A1 | 10/2014 | Fowler |
| 2014/0330074 | A1 | 11/2014 | Morriss et al. |
| 2014/0371737 | A1 | 12/2014 | Korvick et al. |
| 2015/0133779 | A1 | 5/2015 | Yurek et al. |
| 2015/0142045 | A1* | 5/2015 | Bacich .................. A61F 2/0027 606/193 |
| 2015/0147345 | A1 | 5/2015 | Kwiatkowski |
| 2015/0150441 | A1 | 6/2015 | OuYang et al. |
| 2016/0290913 | A1 | 10/2016 | Demirci |
| 2017/0367728 | A1 | 12/2017 | Qu et al. |
| 2018/0008559 | A1 | 1/2018 | Katz |
| 2018/0084971 | A1 | 3/2018 | Truckai et al. |
| 2018/0221054 | A1 | 8/2018 | Truckai |
| 2018/0271581 | A1 | 9/2018 | OuYang et al. |
| 2019/0274756 | A1 | 9/2019 | Chee et al. |
| 2020/0008840 | A1 | 1/2020 | Addis |
| 2020/0179006 | A1 | 6/2020 | Plessala et al. |
| 2020/0281639 | A1* | 9/2020 | Murdeshwar .......... A61B 18/04 |
| 2023/0031283 | A1 | 2/2023 | Hsu et al. |
| 2023/0225764 | A1 | 7/2023 | Kai |

FOREIGN PATENT DOCUMENTS

| | | |
|---|---|---|
| EP | 0319394 A1 | 7/1989 |
| EP | 0642766 A2 | 3/1995 |
| EP | 1250897 A1 | 10/2002 |
| EP | 0890342 B1 | 9/2003 |
| EP | 2329793 A2 | 6/2011 |
| JP | S61113437 A | 5/1986 |
| KR | 101326200 B1 | 11/2013 |
| WO | 1996018350 A1 | 6/1995 |
| WO | 97/22309 A1 | 6/1997 |
| WO | 01/74417 A2 | 10/2001 |
| WO | 2012060932 A2 | 5/2012 |
| WO | 2014111943 A2 | 7/2014 |
| WO | 2014121333 A1 | 8/2014 |
| WO | 2015004667 A1 | 1/2015 |
| WO | 2015077333 A1 | 5/2015 |
| WO | 2018/101934 A1 | 6/2018 |
| WO | 2018/102590 A1 | 6/2018 |
| WO | 2019209775 A2 | 10/2019 |
| WO | 2020033625 A1 | 2/2020 |
| WO | 2022/051637 A1 | 3/2022 |
| WO | 2022108961 A1 | 5/2022 |

* cited by examiner

MEDICAL DEVICE FOR FEMALE REPRODUCTIVE HEALTH AND METHOD OF USE

RELATED APPLICATIONS

This application claims priority to U.S. Provisional Patent Application No. 63/074,096, filed Sep. 3, 2020, U.S. Provisional Application No. 63/110,544, filed Nov. 6, 2020, U.S. Provisional Application No. 63/123,694, filed Dec. 10, 2020, and U.S. Provisional Application No. 63/136,338, filed Jan. 12, 2021. The entire contents of the above application are hereby incorporated by reference as though fully set forth herein.

FIELD

The present invention relates in general to medical devices used in female reproductive procedures. More specifically, the present invention relates to a device and method for improving the intrauterine environment prior to and during pregnancy.

BACKGROUND

Artificial reproductive technology ("ART") is not a new concept. There exists a plethora of issues that may prevent or decrease the likelihood of a successful pregnancy. Although ART has made specific technological advances in order to solve the recurring problems with female fertility, very little has been done to increase the chances of a fertilized egg successfully implanting itself onto the lining of the uterus—a critical step during the pregnancy process.

Once the egg is fertilized, it must then successfully implant itself on the wall of the uterus so that placentation can occur, which allows the fertilized egg to receive necessary nutrients from the mother. Unfortunately, although fertilization may be successful, repeated implantation failure ("RIF") often occurs in mothers using ART; such failures are often attributed to abnormalities in the endometrium at the time of implantation or the mother's immune system.

Currently, physicians will intentionally scratch the endometrium layer of the uterus in order to trigger an inflammatory response within the uterine cavity prior to ovulation. The body's natural wound healing response following the scratch improves the environment of the endometrium and makes it more likely for an embryo to implant and create a pregnancy.

As of now, there is no device tailored to enable a physician to create a precision "scratch" along the endometrium layer of the uterus while viewing the position of the device inside of the patient. Presently, medical professionals will take a catheter, or some other similar device, and blindly push the device forward until they feel some form of resistance; believing the resistance is caused by the uterine wall, the medical professional will start scratching. This seemingly archaic and barbaric way of performing the procedure leads to unnecessary deep punctures, or even a complete perforation in the uterine wall.

The chances of a successful pregnancy are increased when the patient's fallopian tubes are free of blockages. A hysterosalpingogram ("HSG") is an x-ray procedure performed on a female patient to see whether the patient's fallopian tubes are open and if the inside of the uterus is normal. HSG is an outpatient procedure that usually takes less than 5 minutes to perform. It is usually done after the menstrual period ends but before ovulation.

In a typical HSG procedure, a woman is positioned under a fluoroscope (a x-ray imager that can take pictures during the study) on a table. The gynecologist or radiologist then examines the patient's uterus and places a speculum in her vagina. Her cervix is cleaned, and a device (cannula) is placed into the opening of the cervix. The doctor gently fills the uterus with a liquid containing iodine (a fluid that can be seen by x-ray) through the cannula. The contrast will be seen as white on the image and can show the contour of the uterus as the liquid travels from the cannula, into the uterus, and through the fallopian tubes. As the contrast enters the tubes, it outlines the length of the tubes and spills out their ends if they are open. Abnormalities inside the uterine cavity may also be detected by the doctor observing the x-ray images when the fluid movement is disrupted by the abnormality. Often, side views of the uterus and tubes are obtained by having the woman change her position on the table. This procedure typically requires doctors to use multiple tools simultaneously, such as positioning a catheter, a syringe, and a device to prevent dye leakage, all while viewing the image of the fallopian tubes on the x-ray.

Typically, HSG procedures are performed separate and apart from procedures to create an abrasion on the endometrium layer. This requires the patient to undergo two procedures and requires the medical practitioner to use a plurality of tools. These existing procedures also require multiple hands working simultaneously to control the various instruments involved. Accordingly, there is a strong need for a single device that can be manually controlled with a single hand and guided into the uterus with precision so as to avoid unnecessary trauma and injury while simultaneously freeing the patient's fallopian tubes of blockages.

BRIEF SUMMARY OF THE INVENTION

The subject invention solves the existing problem in the art by allowing the physician to carefully guide the device through the cervix and into the uterine cavity. Additionally, once in the uterus, the device's articulating arm allows the medical professional to make a precise, small abrasion on the endometrium wall while avoiding the risk of puncturing or penetrating the uterine wall.

The disclosed medical device allows the user to perform the abrasion procedure and/or an HSG procedure while controlling the instrument with one hand. The preferred embodiment comprises a body that includes a handle integrally connected to an arm that houses an articulating tube. The handle comprises a fluid cassette in communication with the articulating tube and a trigger. When the trigger is actuated, the articulating tube is operable to curl beyond the distal end of the arm. The handle further comprises a means for pumping fluid from the cassette through the articulating tube. The arm further comprises a shielding device that is operable to slidably engage the arm of the device and the shield and the arm are configured to cover and sealingly engage the external os of the cervix to prevent reflux during use.

Alternative embodiments of the medical device include digital viewing means, including use of a flexible scope disposed within the arm of the medical device and a viewing screen mountably attached to the body of the device.

Alternative embodiments of the medical device include other means for performing the abrasion, including a retractable balloon, ensnare tip, or wire.

Alternative embodiments of the invention include methods of using the disclosed medical device to perform a precise endometrial abrasion and/or HSG procedure.

DETAILED DESCRIPTION

Figure 1:
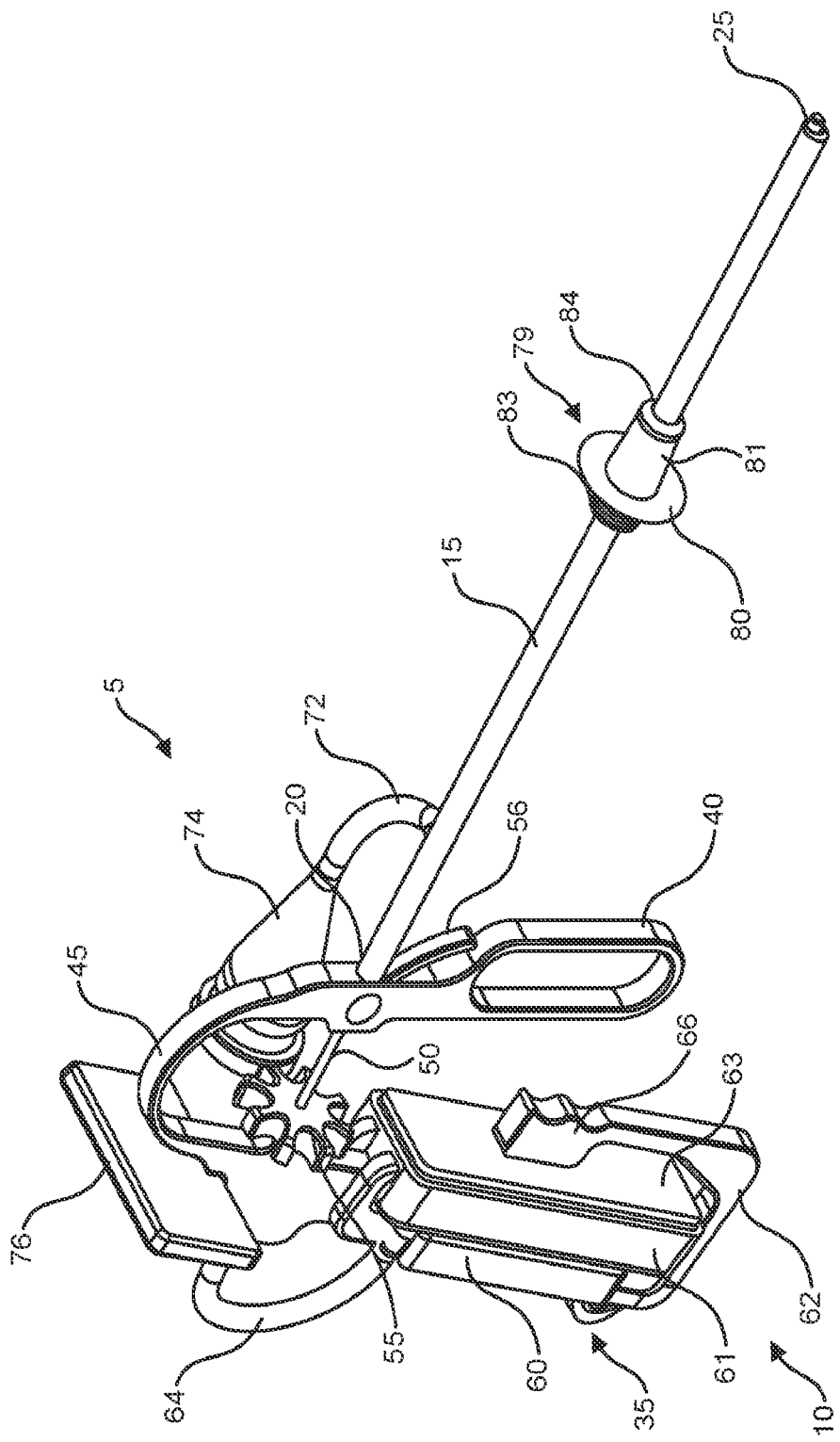
FIG. 1 is an isometric view of a medical device in accordance with the preferred embodiment of the invention showing the articulating tube in an retracted position.
Figure 2:
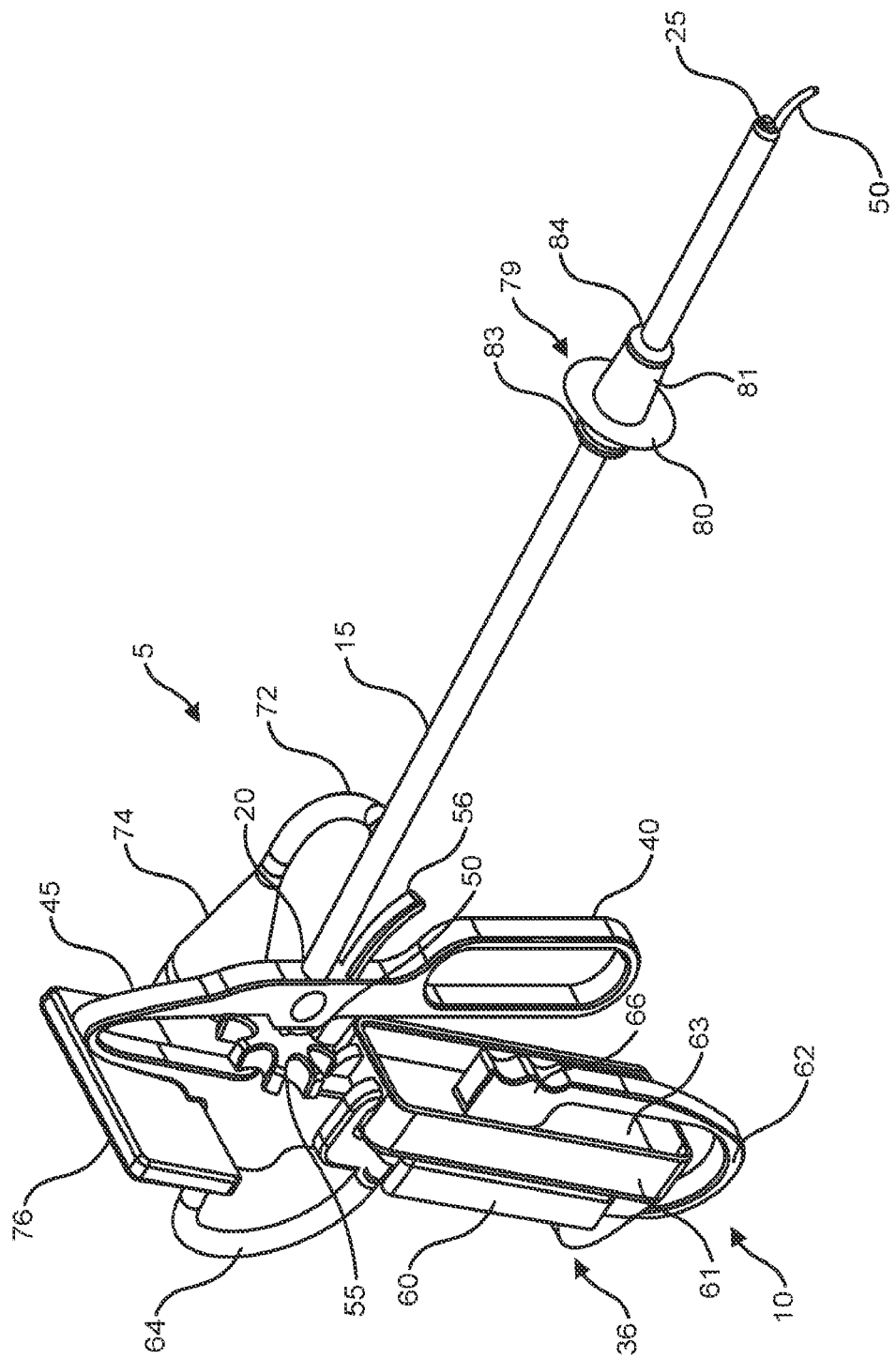
FIG. 2 is an isometric view of a medical device in accordance with the preferred embodiment of the invention showing the articulating tube in an extended position.
Figure 3:
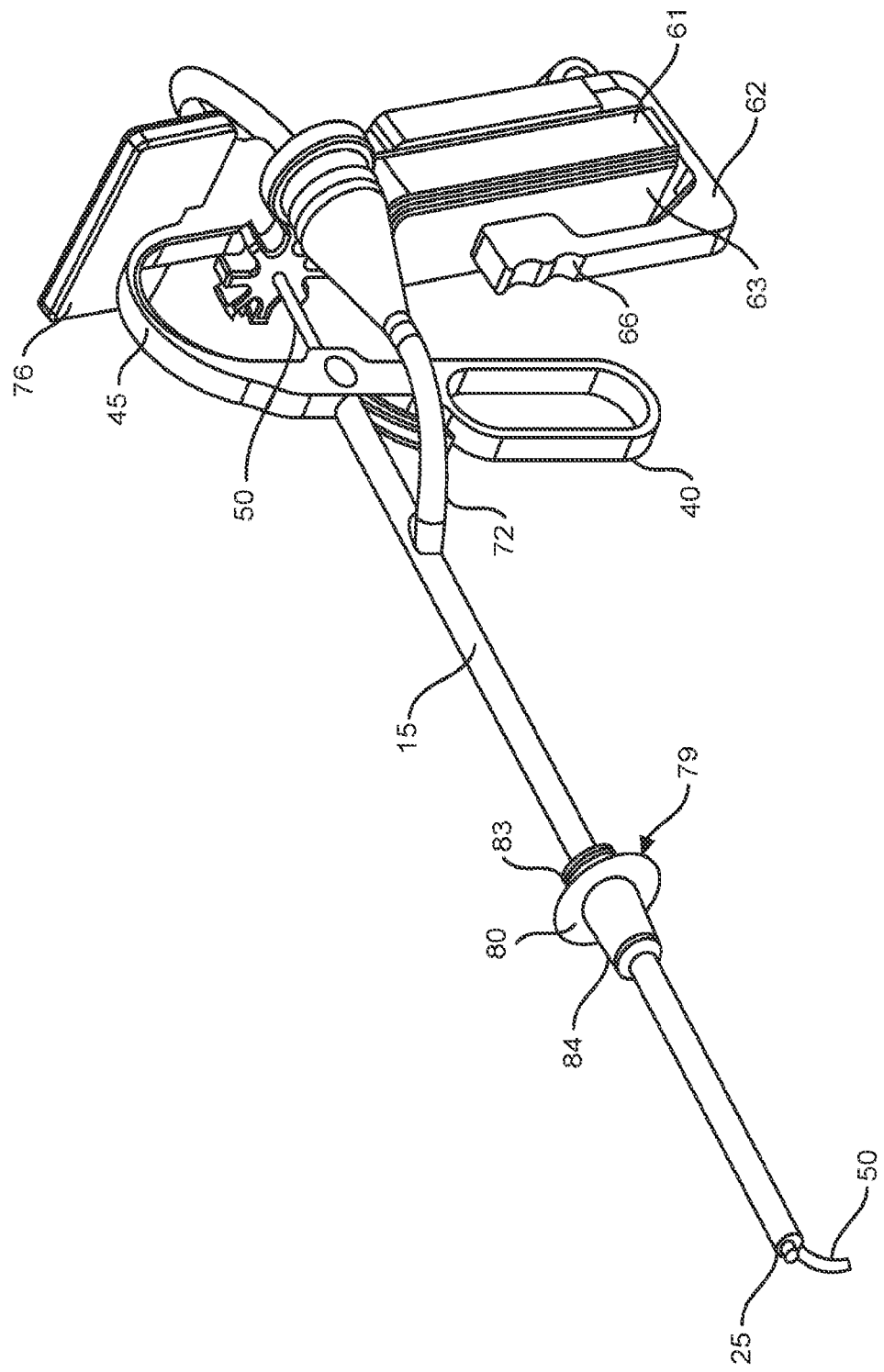
FIG. 3 is an alternative isometric view of a medical device in accordance with the preferred embodiment of the invention showing the articulating tube in an extended position.

Turning to FIGS. 1-7, a preferred embodiment of the medical device 5 is shown. As shown in FIGS. 1-2, the medical device 5 comprises an integral body 10 that includes a handle 35 attached to an arm 15 by way of an arched hinge connection 45.

The arm 15 has a proximal end 20 and a distal end 25 with an articulating lumen 30 disposed therein (FIG. 6) and extending along the length of the arm 15 from the proximal end 20 to the distal end 25. The articulating lumen 30 is operable to receive an articulating tube 50 having an open first end and opposing open second end 52 (FIG. 6) with an internal bore extending the entire length thereof. The arm 15 and articulating tube 50 must be made from materials with sufficient flexibility to allow the physician or user to navigate the arm through the vagina, cervix, and into the uterus.

Figure 4:
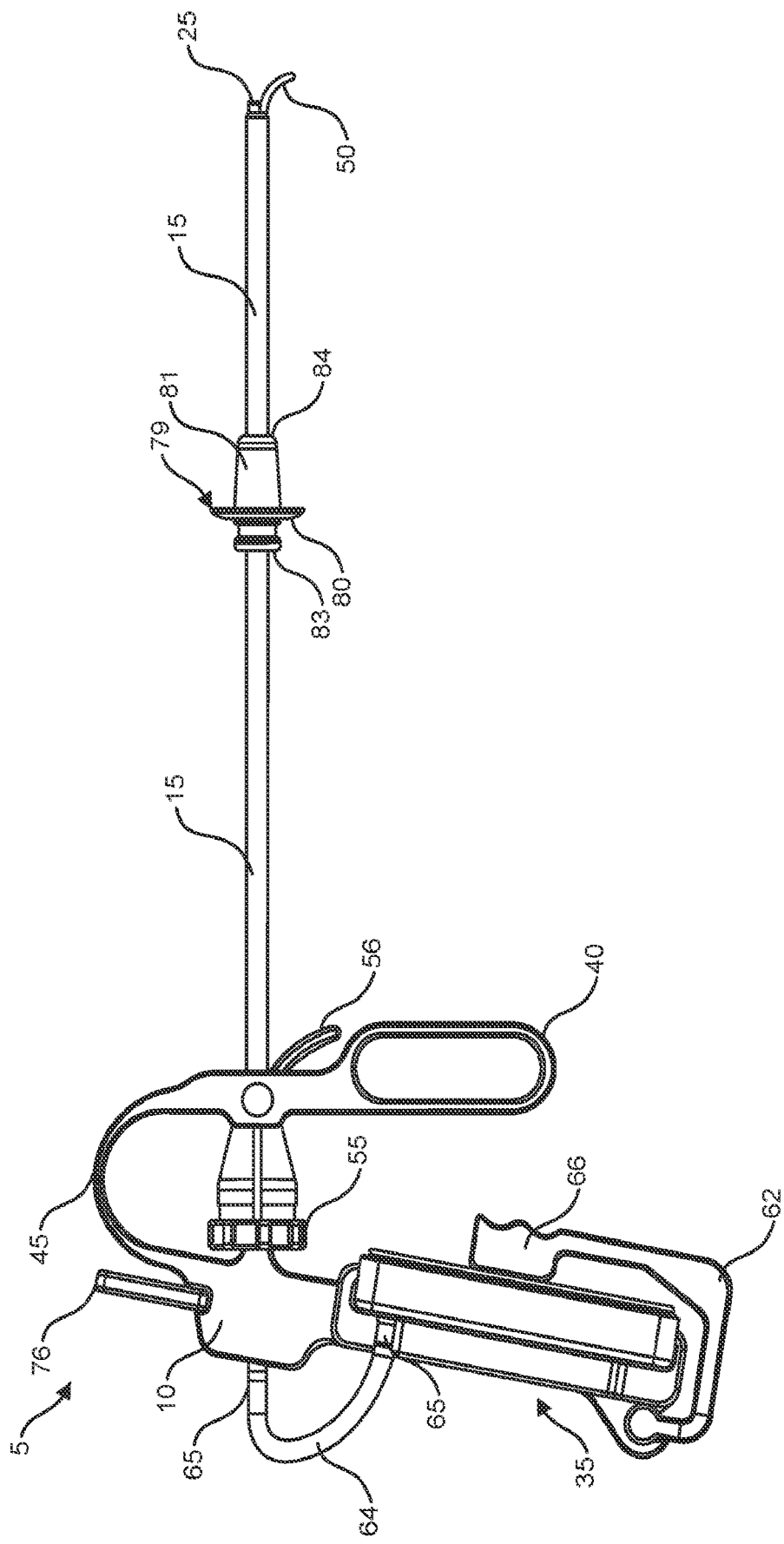
FIG. 4 is a side view of a medical device in accordance with the preferred embodiment of the invention showing the articulating tube in an extended position.
Figure 5:
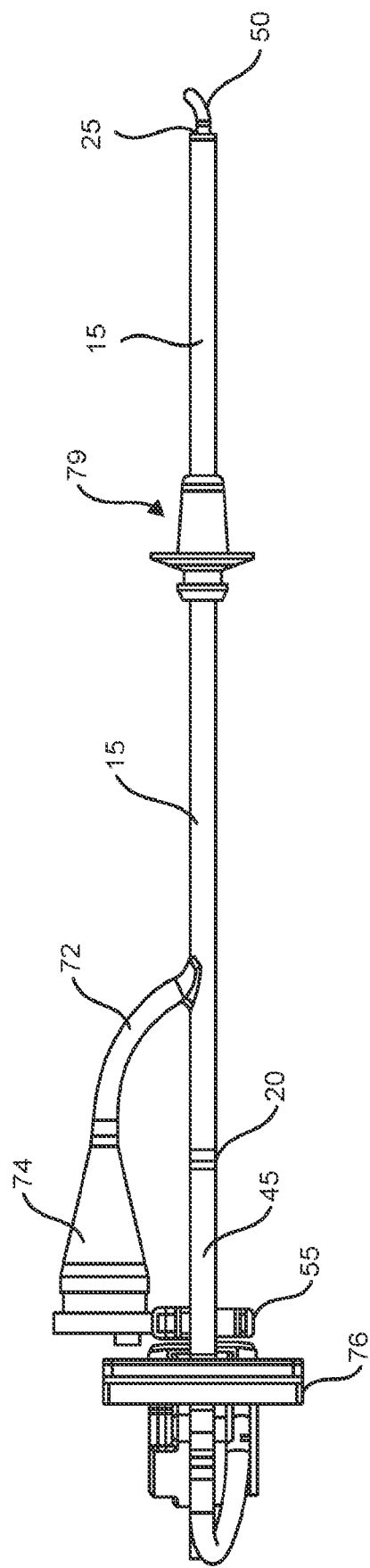
FIG. 5 is a top view of a medical device in accordance with the preferred embodiment of the invention showing the articulating tube in an extended position.
Figure 6:
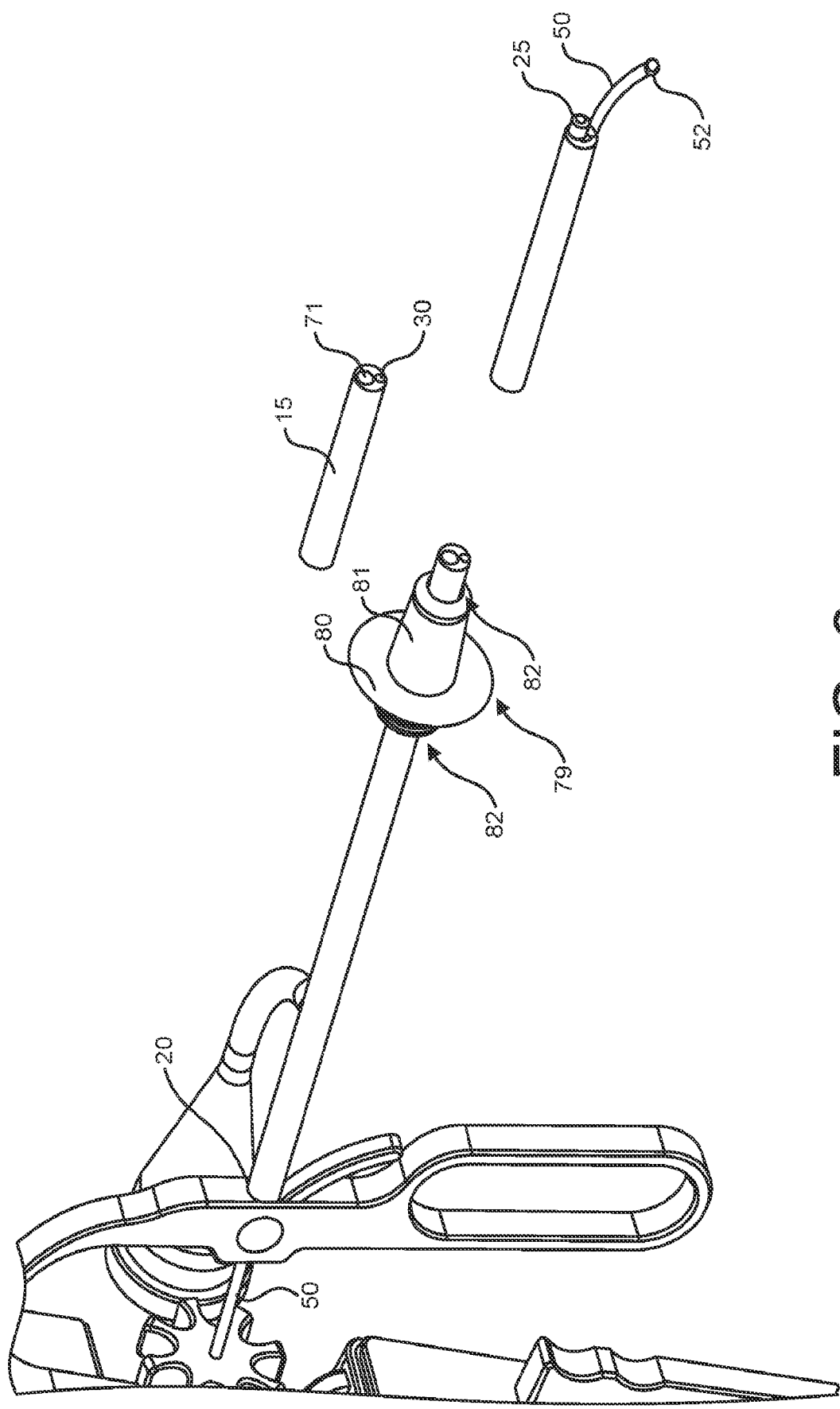
FIG. 6 is a cutaway cross-sectional view of a medical device in accordance with the preferred embodiment of the invention showing the lumens disposed within the arm.

The handle 35 includes a trigger 40 and a cartridge port 60 configured to receive a fluid cassette 61. The first end of the articulating tube 50 is in fluid communication with the fluid cassette 61, preferably via a connection tube 64 with quick-connect fasteners 65, as seen in FIG. 4. The handle 35 further comprises a hinge handle 62 that is operable to secure the fluid cassette 61 in place. The hinge handle 62 may form an integral part of the handle 35 or may be removably attached to the handle 25. Alternatively, as seen in the preferred embodiment, the hinge handle 62 may be U-shaped and include an ergonomic plunger 66 configured for easy activation by the user's hands while holding the handle 35. When a user squeezes the plunger 66, an inward force is directed to the bladder 63 disposed on the fluid cassette 61 results in fluid being squeezed from the fluid cassette 61 into the first end of the articulating tube 50 via the connection tube 64, and the fluid will be dispersed out the open second end 52 (FIG. 6).

The proximal end 20 of the arm 15 is fixedly attached to the trigger 40, such that when the trigger 40 of the handle 25 is pulled proximally towards the handle 25, the articulating tube 50 extends beyond the distal end 25 of the arm 15. The second end 51 of the articulating tube 50 is operable to curl in the extended position (FIG. 2) up to ninety degrees from the longitudinal axis of the articulating tube and flexible enough to retract within the articulating lumen 30 in the retracted position (FIG. 1). For example, the articulating tube 50 may be made from materials having shape-memory properties, including, for example, Nickel-Titanium (or "NiTi"). The arched hinge connection 45 is made from a semi-rigid, flexible material (e.g. TR-90 Nylon) that allows it to retain its shape but also flex when the trigger 40 is pulled. For embodiments where the trigger and handle are not integrated, any hinge connection may be used so long as the axial movement of the arm 15 over the articulating tube 50 is allowed.

In yet another embodiment of the invention, the medical device 5 includes a rotator 55 operable to rotate the articulating tube 50 along its longitudinal axis, such that the second end 52 of the articulating tube 50 is allowed to articulate when in the extended, curled position. As shown in FIGS. 1-2, the rotator 55 is preferably placed in proximity to the handle 35 such that the user can activate the rotator 55 with his thumb, or other fingers, while maintaining control of the device 5 with his hand.

In yet another embodiment of the invention, the medical device 5 includes a rotational lock 56. The rotational lock 56, when actuated, serves to lock the articulating tube 50 in a particular extended position while also allowing the articulating tube 50 to freely rotate. The rotational lock 56 allows the user to disengage the trigger 40, allowing the user to focus on the procedure without having to apply a constant force to the trigger 40.

When performing an abrasion on the endometrial lining of the uterus, it is critical to know the location of the second end 52 of the articulating tube 50 in relation to the endometrial lining of the uterus. One way this is accomplished is by dispersing fluid or dye into the uterus such that the uterus can be viewed on an ultrasound or via X-ray. For either method, the ultrasound dye or fluoroscopy can be the fluid contained in the fluid cassette 61.

Figure 7:
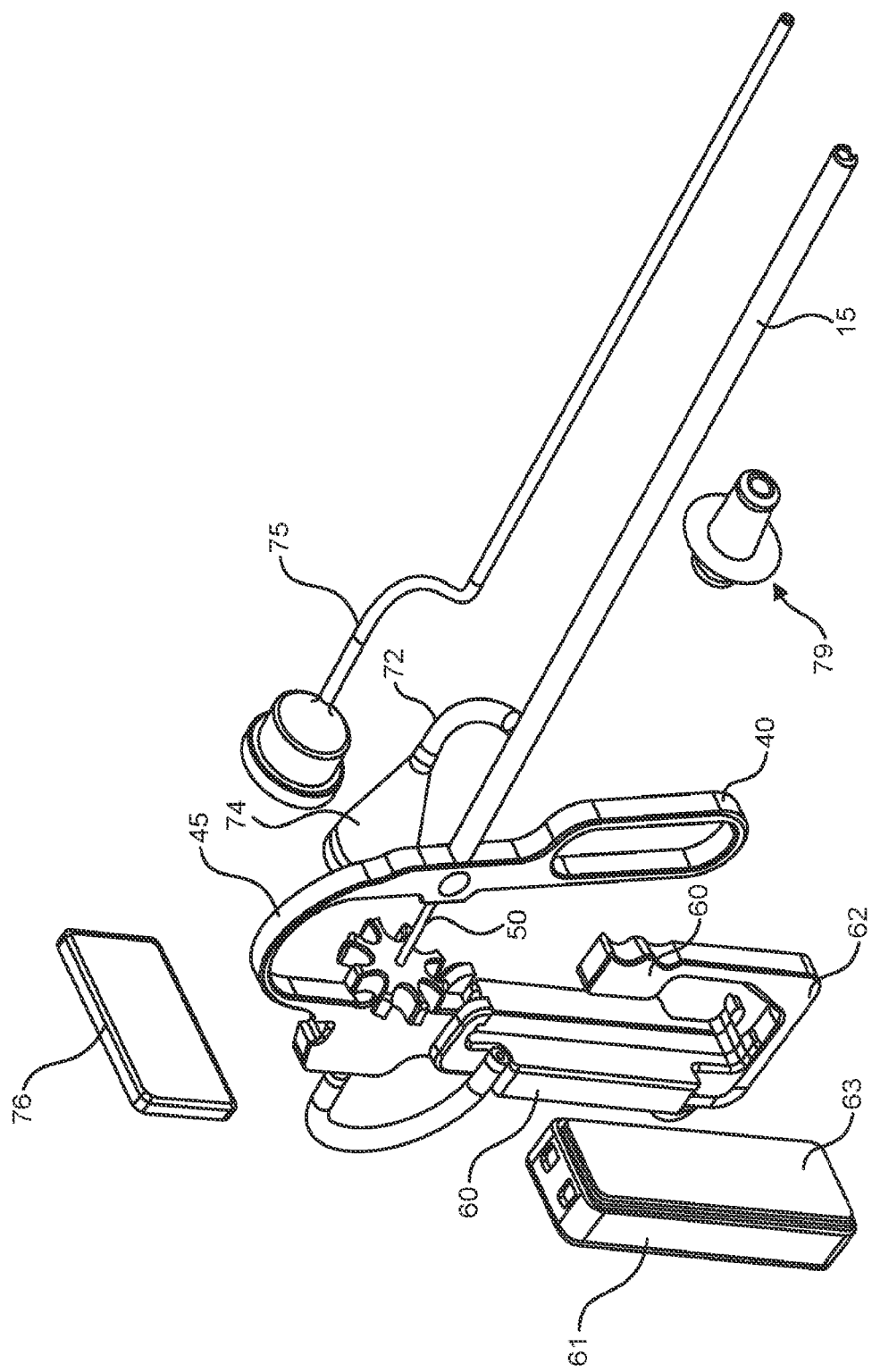
FIG. 7 is an exploded view of a medical device in accordance with the preferred embodiment of the invention.

Alternative embodiments of the medical device 5 include additional imaging means that allow the user to know the location of the articulating tube 50 within the uterus. As shown in FIG. 6, the arm 15 may include an additional optical lumen 71. Turning to FIG. 7, the optical lumen 71 is adapted to receive a flexible scope 75 (e.g. optical scope, fiberoptic scope, or hysteroscope) with a camera positioned at the distal end 25 of the arm 15. The arm 15 includes a port 72 and adaptor 74 operable to receive and house the scope 75. To enhance viewing capabilities while holding the device 5, an imaging screen 76 is mountably attached to the body 10. The imaging screen 76 communicates with the scope 75 such that the image displayed through the scope 75 is enhanced on the imaging screen 76.

When distending the uterus to view the uterus under X-Ray or ultrasound, or alternatively, while performing an HSG procedure, it is critical that the uterus remain distended for the duration of the procedure. Consequently, as fluid is injected into the uterus, it is important to prevent reflux of the fluid out of the cervix. In yet another embodiment, the medical device 5 includes a shielding device 79 operable to sealingly engage the external os of the cervix during the aforementioned procedures. An exemplary embodiment of the shielding device 79 includes a shield 80 and shielding device arm 81 secured to the shield 79. The shielding device 79 includes a bore that is operable to slidably engage the arm 15. The shielding device arm 81 is inserted into the cervix and the shield 80 and arm 81 are operable to prevent reflux out of the cervical os. Other exemplary embodiments of the shielding device 79 are discussed in FIGS. 15-17.

Turning to FIGS. 8-19, alternative embodiments the invention are shown. For purposes of this application, other embodiment and components of the medical device 100 disclosed in FIGS. 8-19, where applicable, may be incorporated into the preferred embodiment of the medical device 5 disclosed in FIGS. 1-7.

Figure 8:
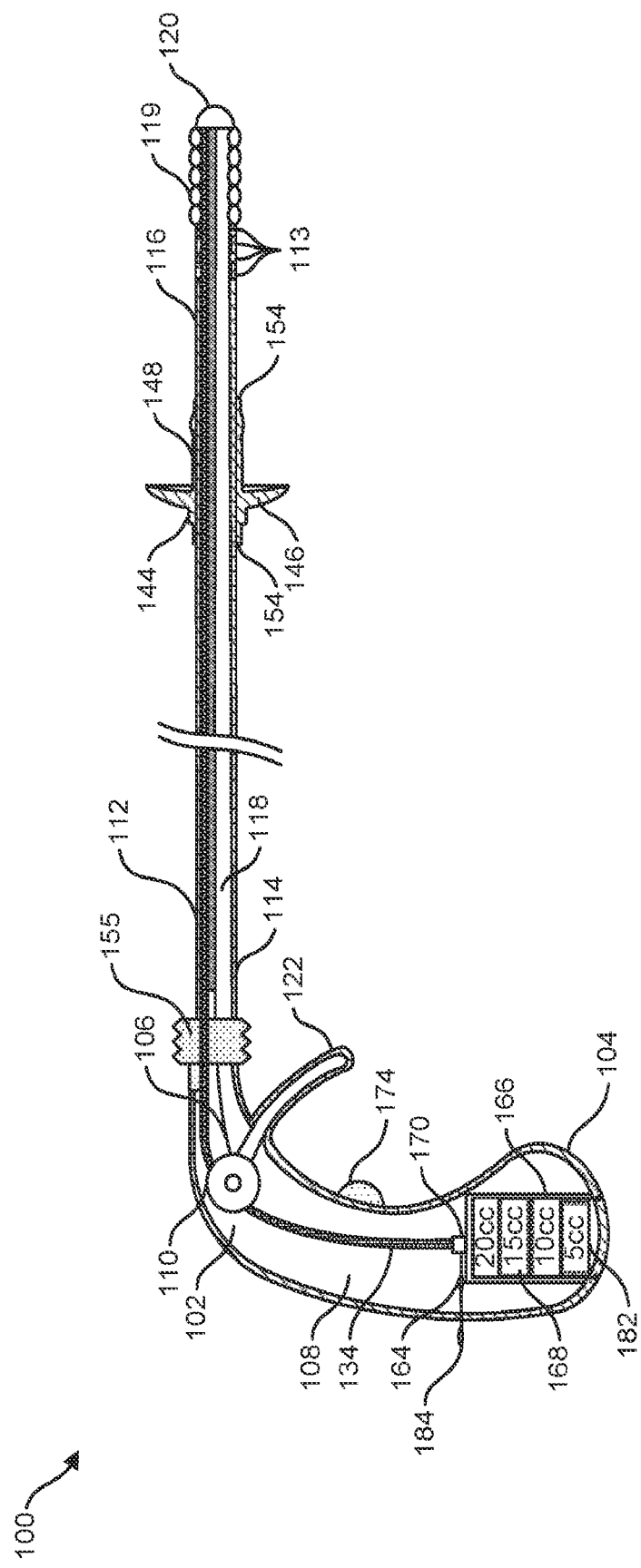
FIG. 8 is a side view of an alternative embodiment of the invention.

As shown in FIG. 8, a medical device 100 including a body 102 having a handle end 104 opposite an arm end 106. The body 102 may be made from materials such as metals, plastic, or carbon fiber. A handle 108 is defined by the body 102. An arm 112 is connected to the body 102. In one embodiment, the handle 108 is offset from the longitudinal plane of the arm 112. The arm 112 has a proximal end 114 opposite a distal end 116. The arm 112 may be made from a flexible material such as polymers, thermoplastics, or thermoset materials, for example. In embodiments made of flexible material, the arm 112 is operable to be bent and shaped to enable the physician to target an area in any plane for an abrasion in a patient's uterus. In another embodiment, the arm 112 may be made from a rigid material such as metals, plastic, or carbon fiber, for example. Markings 113 indicate the depth of the device 100 inside of the patient and can be applied to any embodiments disclosed herein.

Figure 9:
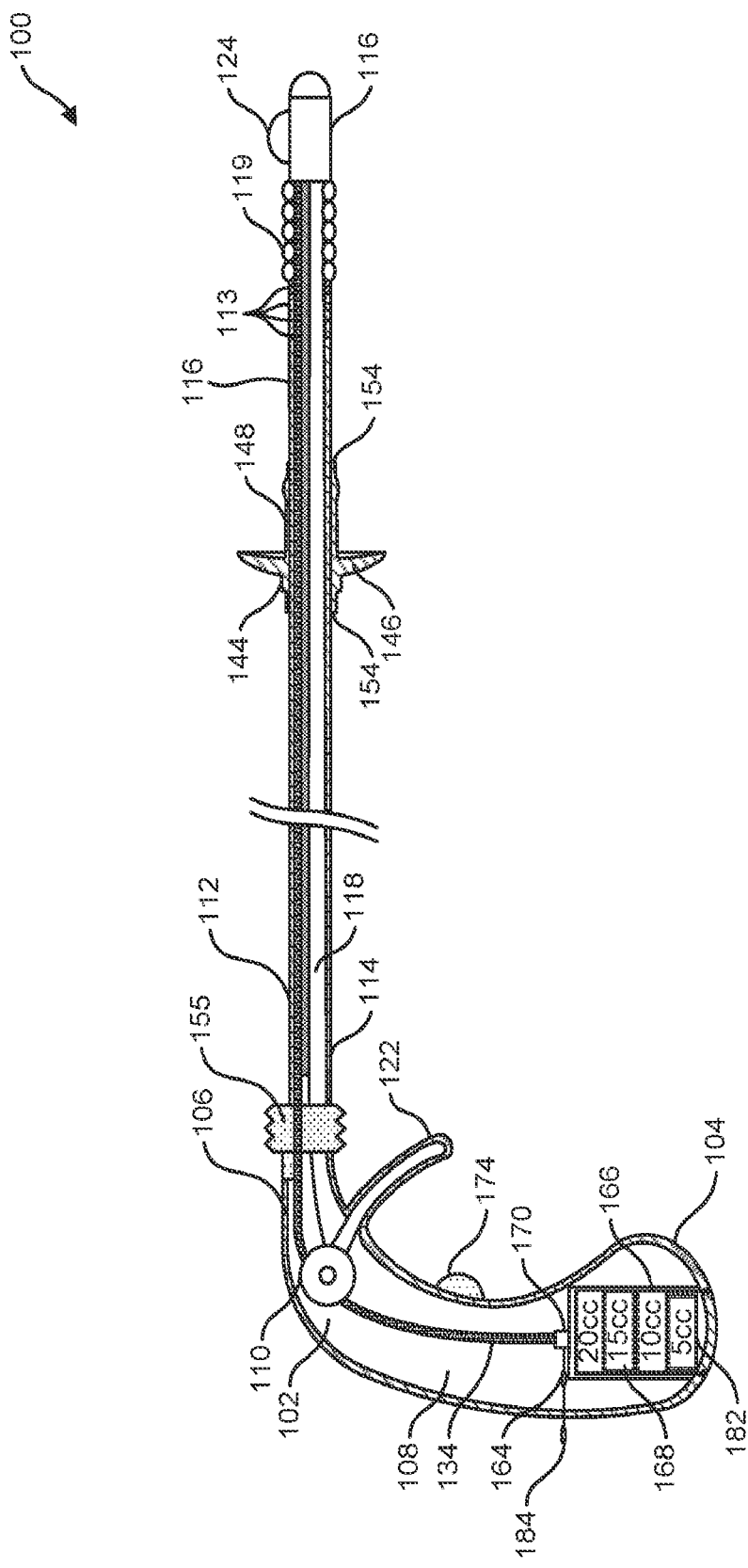
FIG. 9 is a side view of an alternative embodiment of the invention showing a wire tip.

In one alternative embodiment, as illustrated in FIGS. 8-9, the medical device 100 includes an alternative means for holding dispersing fluid through the medical device. The body 102 of the medical device 100 defines a cartridge port 166 operable to receive and secure a fluid cartridge such as a saline or dye cartridge 168. The body 102 may include a hinge or slide door 182 for access to the cartridge port 166. The body 102 may be manufactured from a transparent material to enable viewing of the saline cartridge 168. A pump 170 is operable to pump saline from the cartridge 168 through the fluid passage 134 and into the patient. The pump 170 may be powered by a battery 164 and activated by a button 174 electronically connected to the pump 170. In some embodiments, a pull tab 184 will be used to activate the battery 164 to power the pump 170. The fluid dispersing means disclosed in this paragraph are operable for use with any of the embodiments disclosed herein, including the preferred embodiment described in FIGS. 1-7, as well as with any type of tip, including an articulating tip 120, a wire 124, an ensnare tip 125, and an inflatable balloon 128, as illustrated in FIGS. 8-14. A conduit 118, as illustrated in FIG. 8, is defined by the arm 112. The arm 112 maybe 3 mm in diameter, for example. A high flow output port 119 is disposed end of the arm 112 and is operable to receive and discharge a fluid flowing through the fluid passage 134.

The medical device 100 may be configured with a variety of tips operable to make an abrasion on the endometrial lining of the patient's uterus. Each type of tip is operable to function with the other features of the invention disclosed herein. In one embodiment, as illustrated in FIG. 8, an articulating tip 120 is provided. Articulating tip 120 is disposed at the distal end 116 of the arm 112. The handle 108 contains a spring-loaded trigger mechanism 110 operable to curl the articulating tip 120 in a variety of planar directions by pulling a trigger 122. Preferably, the handle 108 is offset approximately 45° from the longitudinal plane of the arm 112 to allow for easier guidance of the arm 112 into the uterine cavity, and said handle 108 is positioned such that the index finger (not shown) of the user can easily actuate the trigger 122.

Figure 10:
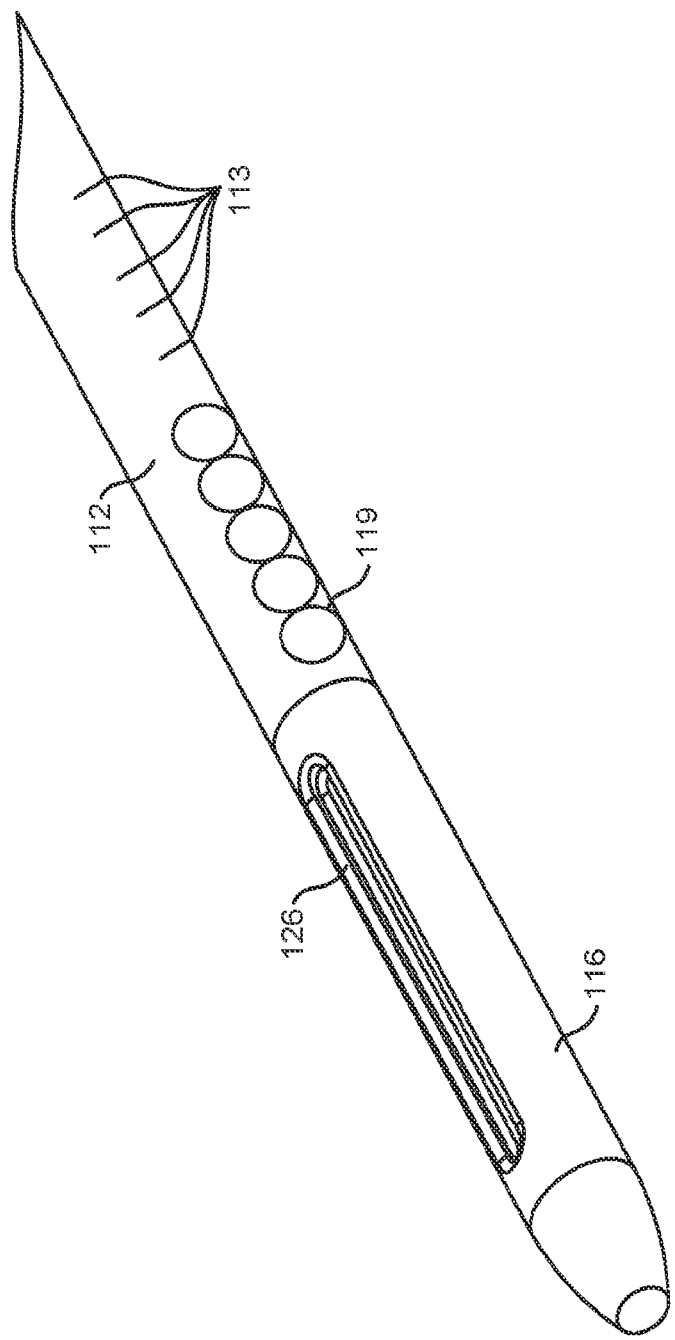
FIG. 10 is a perspective view of an alternative embodiment of the invention showing a wire tip in the retracted position.
Figure 11:
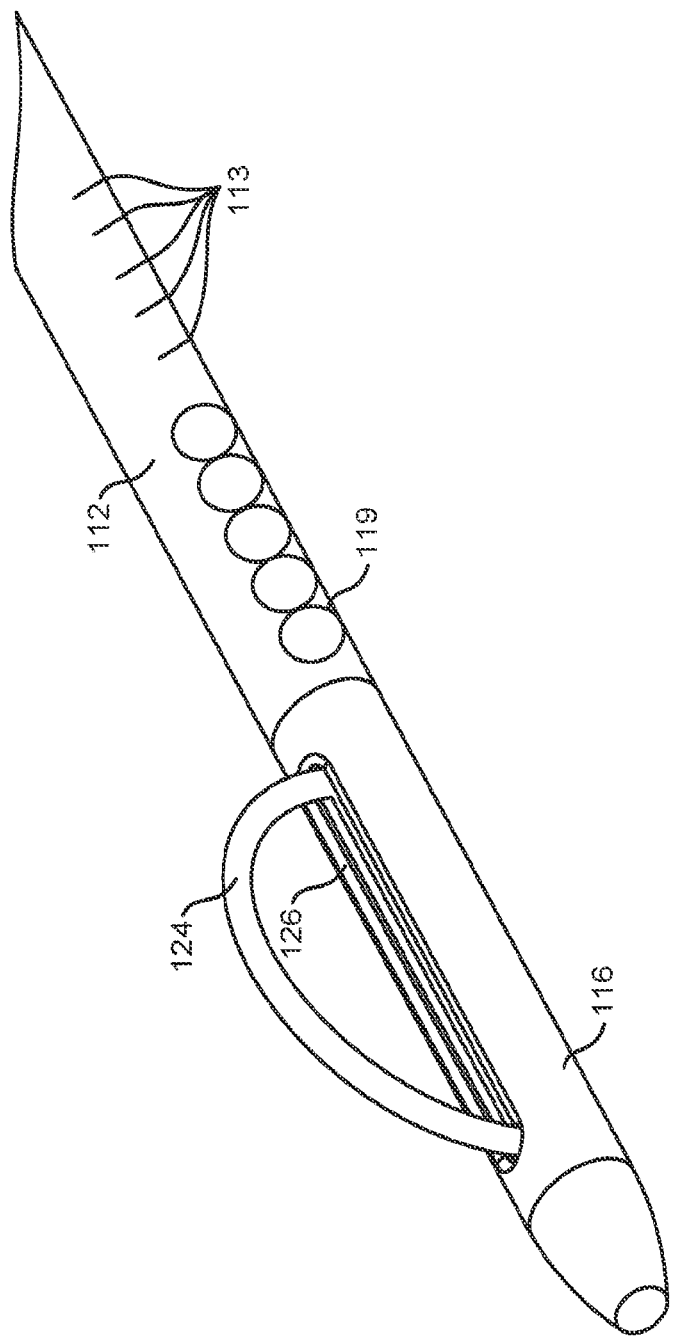
FIG. 11 is a perspective view of an alternative embodiment of the invention showing a wire tip in the extended position.

In an alternative embodiment, as illustrated in FIGS. 9-11, a wire 124 is provided at the distal end 116. A wire recess aperture 126 is defined by the distal end 116 of the arm 112. The wire 124 is disposed within the conduit 118. The wire 124 is operable to extend through the wire recess aperture 126. A trigger mechanism 110 is disposed within the handle 108 and is operable to extend and retract the wire 124 through the wire recess aperture 126. The trigger mechanism 110 may be spring-loaded, for example. In one embodiment, the wire 124 is operable to curl to form an arc and extend through the wire recess aperture 126.

Figure 12:
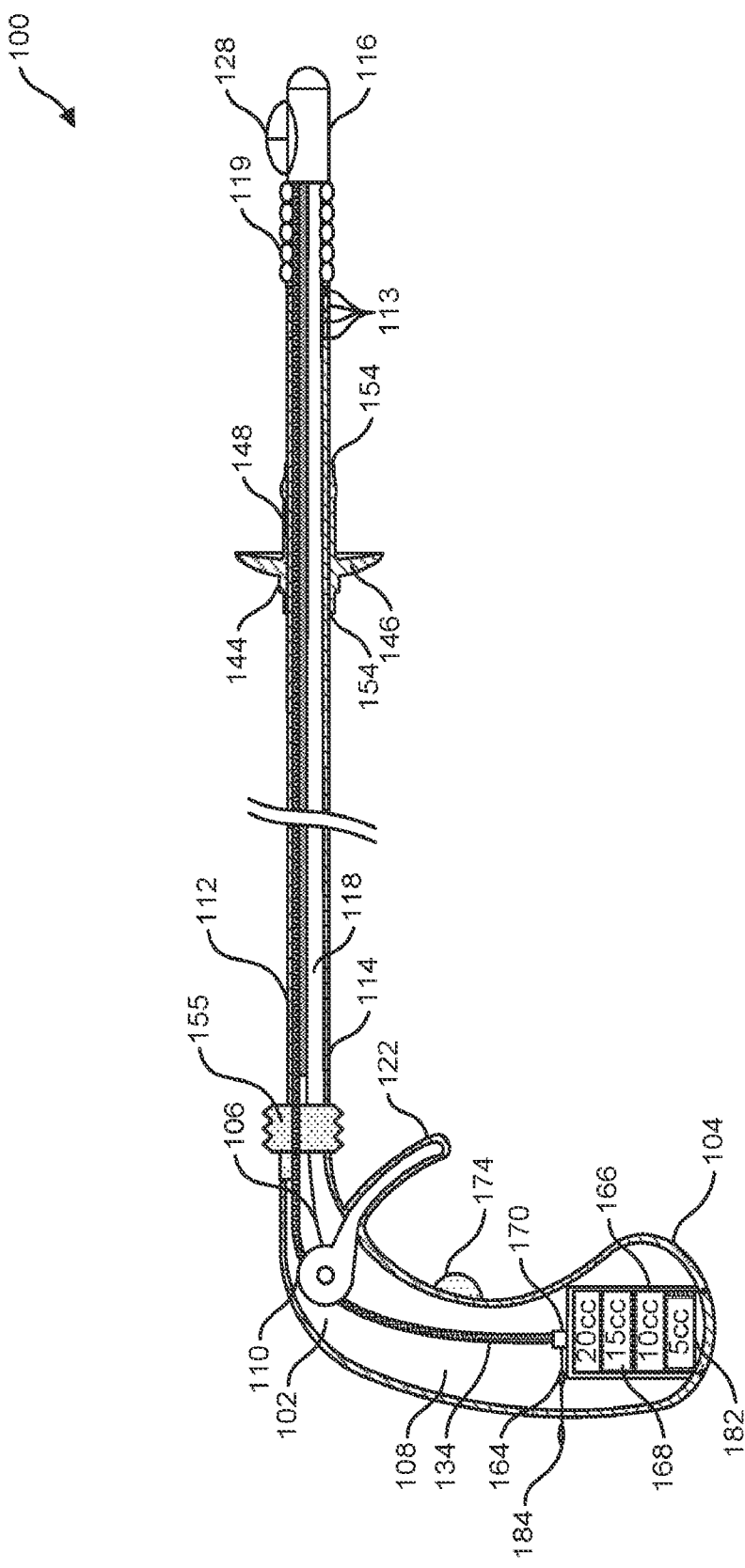
FIG. 12 is a side view of an alternative embodiment of the invention showing an inflatable balloon tip in the expanded position.
Figure 13:
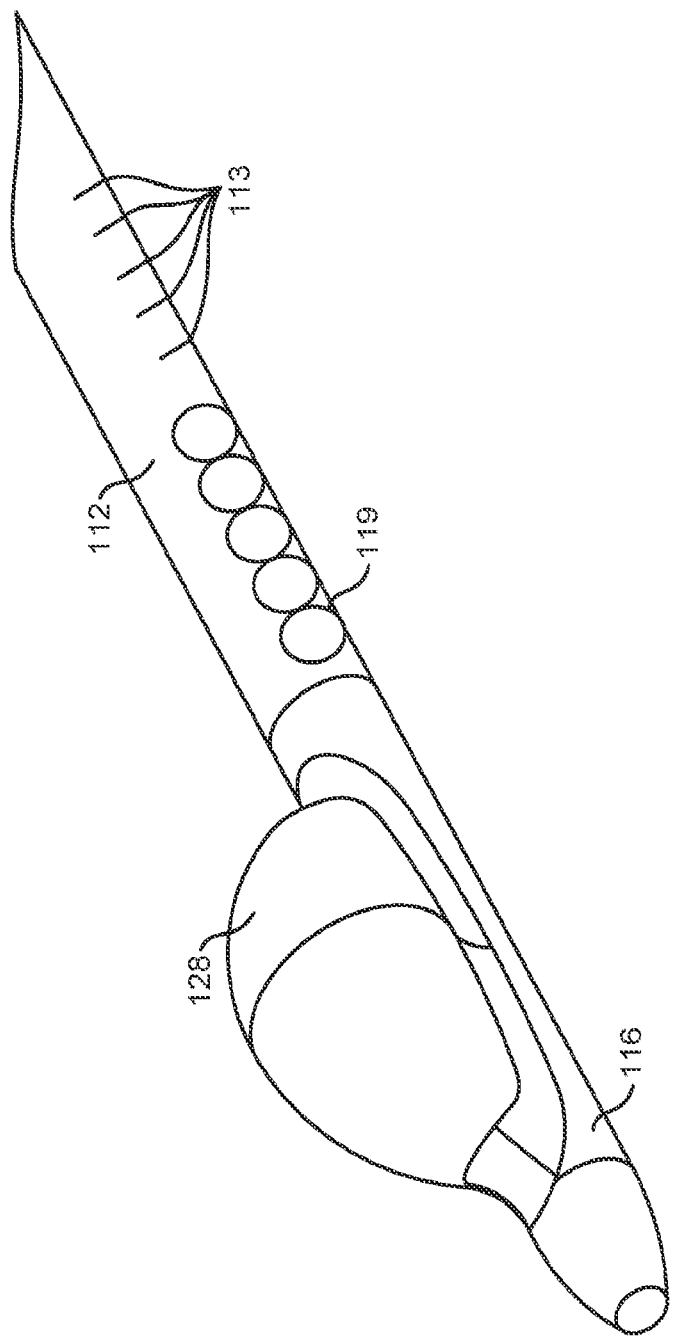
FIG. 13 is a perspective view of an alternative embodiment of the invention showing an inflatable balloon tip in the expanded position.

In another embodiment, as illustrated in FIGS. 12-13, an inflatable balloon 128 is provided at the distal end 116. The inflatable balloon 128 is disposed at the distal end 116 of the arm 112. A trigger mechanism 110 is disposed within the handle 108 and is operable to inflate and deflate the balloon 118. The trigger mechanism 110 may be spring-loaded, for example. The trigger mechanism 110 may inflate the balloon 128 pneumatically, hydraulically, or by injection of a fluid from an external syringe, for example. Means for inflating the balloon 128 may be by a pump contained within the device 100 or an external pump attached to the device 100, for example.

Figure 14:
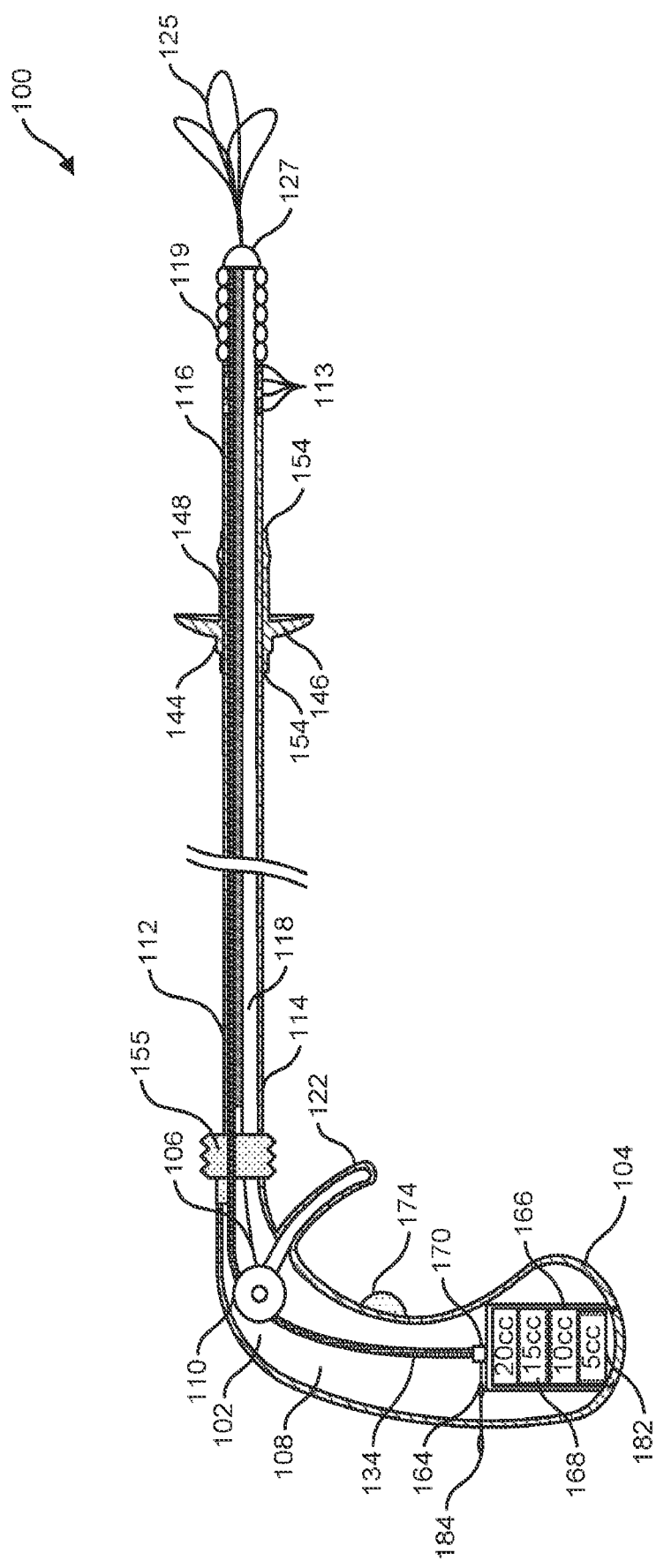
FIG. 14 is a side view of an alternative embodiment of the invention showing an ensnare tip.

In yet another embodiment, as illustrated in FIG. 14, an ensnare tip 125 is provided. An ensnare recess aperture 127 is defined by the distal end 116 of the arm 112. The ensnare tip 125 is operable to retract into and compress within the ensnare recess aperture 127 and operable to expand upon extending from the ensnare recess aperture 127. A trigger mechanism 110 is disposed within the handle 108 and is operable to extend and retract the ensnare tip 125 from the ensnare recess aperture 127. The trigger mechanism 110 may be spring-loaded, for example. Embodiments of the medical device 100 including an ensnare tip 125 enable a medical practitioner to moderate the force of an abrasion on the endometrial lining of a patient, as the ensnare tip 125 will compress upon contact with the endometrial lining of the patient, thereby reducing the force applied to the endometrial lining as opposed to a rigid abrasion tool, for example.

The gauge of the wires comprising the ensnare tip 125 further moderates the contraction of the ensnare tip 125 when contacting the endometrial lining, as thicker wires will provide a higher spring force than thinner wires.

For any of the aforementioned embodiments, an indicator may be included on the body 102 and operable to indicate if the articulating tip 120 is straight or curled, the wire 124 or the ensnare tip 125 is extended or retracted, or if the balloon 128 is inflated or deflated.

Figure 15:
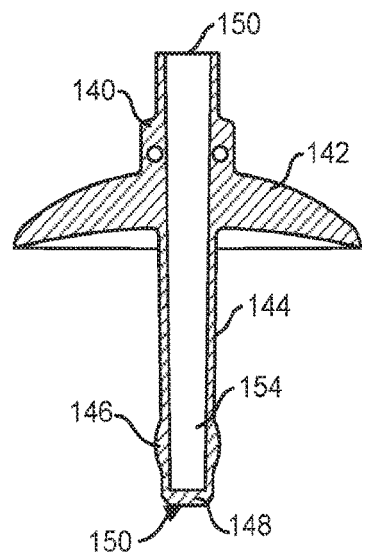
FIG. 15 is a cross sectional view of a shielding device in accordance with embodiments of the invention.
Figure 16:
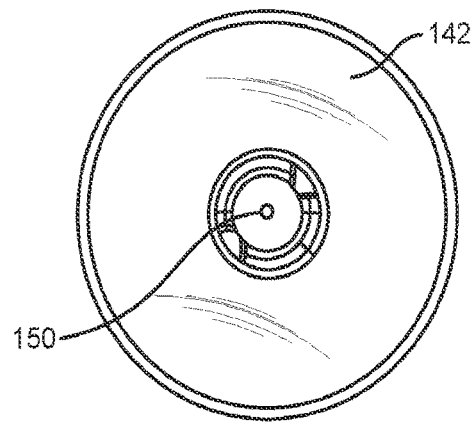
FIG. 16 is a top view of a shielding device in accordance with embodiments of the invention.
Figure 17:
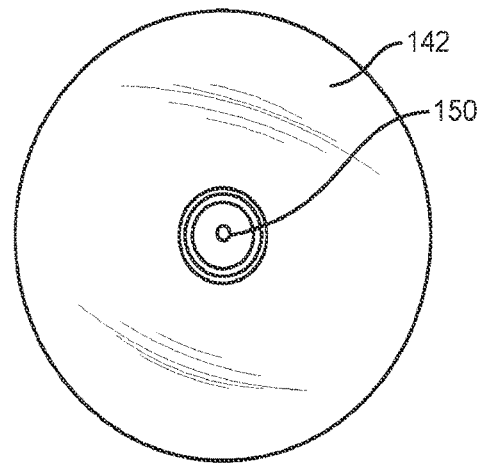
FIG. 17 is a bottom view of a shielding device in accordance with embodiments of the invention.

All of the aforementioned embodiments of the medical device 100 are configured to include a shielding device 140. Additional exemplary embodiments of the shielding device 150 are shown in FIGS. 15-17. The shielding device arm 144 defines an internal bore 154. To accommodate the contours of the portion of the cervix surrounding a patient's external os, the shield 142 may have a concave shape having a concave side and a convex side, wherein the concave side of the shield 142 faces the external os and the convex side faces the vaginal cavity when the medical device 100 is in place.

In one embodiment, the shielding device arm 144 is operable to inflate to further match the internal contouring of the patient's cervix. The shielding device arm 144 may be inflatable by an injection from a syringe, for example, into a port (not shown) on the shielding device 140, for example. The shield 142 may be shaped such that the concave side of the shield 110 fits flush against the external os and cervical tissue surrounding the external os of the patient. The curvature of the shield 142 may be adjusted for different patients. The shielding device arm 144 may be secured to the concave side of the shield 142. In addition, the shield 142 may have a generally circular shape, and the shielding device arm 144 may be secured to the shield 142 generally at the center of the shield. Alternatively, the shield 142 may be of another shape suitable for covering the external os of a patient, such as an elliptical shape.

The shielding device arm 144 may be permanently secured to the shield 142. For instance, the shielding device arm 144 and shield 142 may be molded as a unitary piece of material. Alternatively, the shielding device arm 144 may be secured to the shield 142 with an adhesive. To facilitate ease of entry and exit of the shielding device arm 144 into and out of a patient's cervical canal, the shielding device arm 144 may have a generally cylindrical shape. The arm 112 of the medical device 100 is configured to insert into the bore 154 of the shielding device 140 when the medical device 100 is in use. In one embodiment, the shielding device 140 is permanently affixed to the arm 112. In one embodiment, the shielding device 140 is operable to slide along the arm 112 and be removed therefrom.

As illustrated in FIG. 15, the shielding device arm 144 may have a circumferential bulge 146 to help keep the device 100 in place with the shielding device arm 144 inserted into the cervical canal during use. The bulge 146 is positioned along a length of the shielding device arm 144 between a midway point of the shielding device arm 144 and the distal end 148 of the shielding device arm 144, and may preferably be positioned nearer to the distal end 148 of the shielding device arm 144 than to the midway point of the shielding device arm 144. Once the shielding device arm 144 is inserted into the cervical canal, the wider diameter of the circumferential bulge 146 provides resistance to removal of the shielding device arm 144 from the cervical canal, thereby helping to keep the medical device 100 in place for a period of time after a fluid such as saline has been introduced into the cervical canal or uterine cavity so that the medical device 100 prevents leakage of fluid from the cervical canal into the vaginal cavity. The bulge 146 preferably has a contoured surface to prevent discomfort when inserting the shielding device arm 144 into the cervical canal.

The shielding device 140 may further comprise a valve 150 disposed at the distal end and the proximal end of the shielding device arm 144. The valve 150 is operable between an open position and a closed position. When in a closed position, the valve 150 forms a substantially fluid-tight seal to prevent fluid leakage through the valve 150. In the embodiment illustrated in FIGS. 15-17, the valve 150 is a circular valve with a small circular opening enabling the arm 112 of the medical device to pass through the valve 150 to form a seal around the arm 112. In another embodiment, the valve 150 comprises a plurality of elastomeric flaps integrally attached to the ends of the shielding device arm 144. The elastomeric flaps are resiliently biased inwardly toward the center of the bore 154 and against each other when the valves 150 are in the closed position. The elastomeric flaps are sized and shaped to form a substantially fluid-tight seal over the openings of the bore 154. As used herein, the term "elastomeric" refers to any material that is flexible and/or stretchable such that the material can flex and/or stretch and then return to its original position. In this case, the original position refers to the closed position of the valve. Preferably, the valve 150 have three elastomeric flaps each having a generally triangular shape. The three triangular flaps fit together when the valves 150 are in the closed position to form a substantially fluid-tight seal to prevent fluid leakage through the valve 150.

During a procedure to perform an HSG procedure and/or an endometrial abrasion on the uterine lining of a patient, the arm 112 of medical device 100 is inserted through and secured to the entirety of the shielding device 140. When the arm 112 is pushed through the bore 154, the arm 112 is forced through the valves 150 and thereby forces the internal openings of the valves 150 outward to form seals around the arm 112. In this manner, the medical device 100 may pass through the shielding device 140 to deliver a fluid such as saline into the uterine cavity and perform an endometrial abrasion. With the shielding device 140 secure against the patient's cervical os, a leakproof seal is formed and the fluid injected will remain in the uterus.

Figure 18:
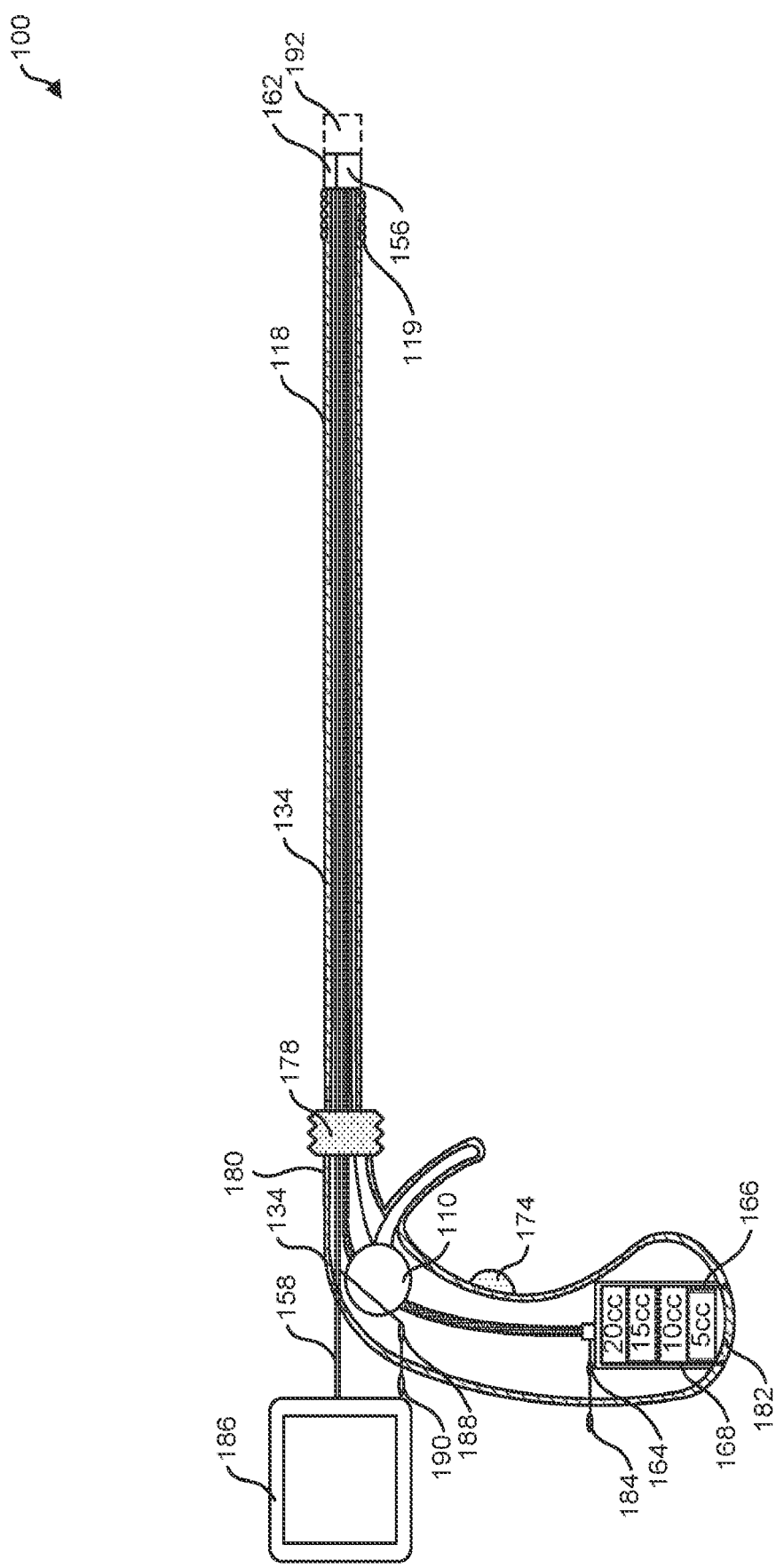
FIG. 18 is a side cross sectional view of a medical device having an imaging device in accordance with embodiments of the invention.

As illustrated in FIG. 18, an alternative embodiment of the invention incorporating imaging means is shown. Here, an imaging device 156 is integral to the medical device 100. Embodiments including integrated imaging eliminate the need for ultrasound, as the physician is able to position and operate the medical device by viewing the video output of the imaging device. The imaging device 156 is positioned on the distal end 116 of the arm 112 and operable to transmit an image of the interior of the patient's uterus via an electronic connector 158. The imaging device 156 may be an optical scope, a fiberoptic scope, hysteroscope, or a camera, for example. In one embodiment, an endoscopy system may be utilized as the imaging device 156 and is a wireless handheld endoscopy system (not shown). Such a system can include an endoscopic cannula, a disposable mount, a focus/Zoom function, a wireless camera, for example, a 2.4 GHZ, high resolution camera used in cooperation with a laptop or other monitor, and controls for imaging and power. An electronic connector 158 is disposed within the conduit 118 and operable to transmit the image of the interior of the patient's uterus to a connection port 160. The conduit 118 is operable to enclose the electronic connector 158, the fluid passage 134, and the mechanical mechanism to operate the tip. A connection port may be defined by the body and operable to receive the image of the patient's uterus from the electronic connector 158 and operable to transmit the image to a display, such as an attachable screen 186 or computing device. In one embodiment, a display may be built integrally into the body 102 of the medical device 100. The connection port 160 may be configured to attach to a display. The connection port 160 may be configured to transmit the image by a wired connection, such as ethernet or USB, or a wireless, such as Bluetooth or Wi-Fi, means. The connection port 160 may be further operable to transmit the image to a computer-readable medium, such as a flash drive, external storage drive, or cloud storage.

In one embodiment, the medical device 100 includes a power source 188, such as a battery or a power cable operable to connect an external power supply, operable to power the imaging device 156, the light source 162, and the display 186. A pull tab 190 is operable to activate the power source 188. The power source 164 may be a battery pack or a power cable operable to connect an external power supply, for example. The power source 164 is further operable to power embodiments of the invention including pump 170.

Referring to FIG. 11, tip 192 may be an articulating tip, balloon, ensnare tip, or wire, as disclosed in FIGS. 1-19, or any other device suitable for performing an abrasion on the interior of a patient's uterus. Highflow output port 119 may be holes defined by the arm 112 or circumferential slits around the circumference of the arm 112, for example. As illustrated in FIG. 18, the imaging device 156 is positioned behind the tip 192 of the arm to enable a physician to see the tip 192. Rotational knob 155 enables rotation of the arm 112 to move the tip 192 into a desired plane. In one embodiment, the medical device 100 includes a light source 162 operable to illuminate the interior of the patient's uterus. The light source 162 may be one or more light emitting diodes or light delivery fibers, for example.

Figure 19:
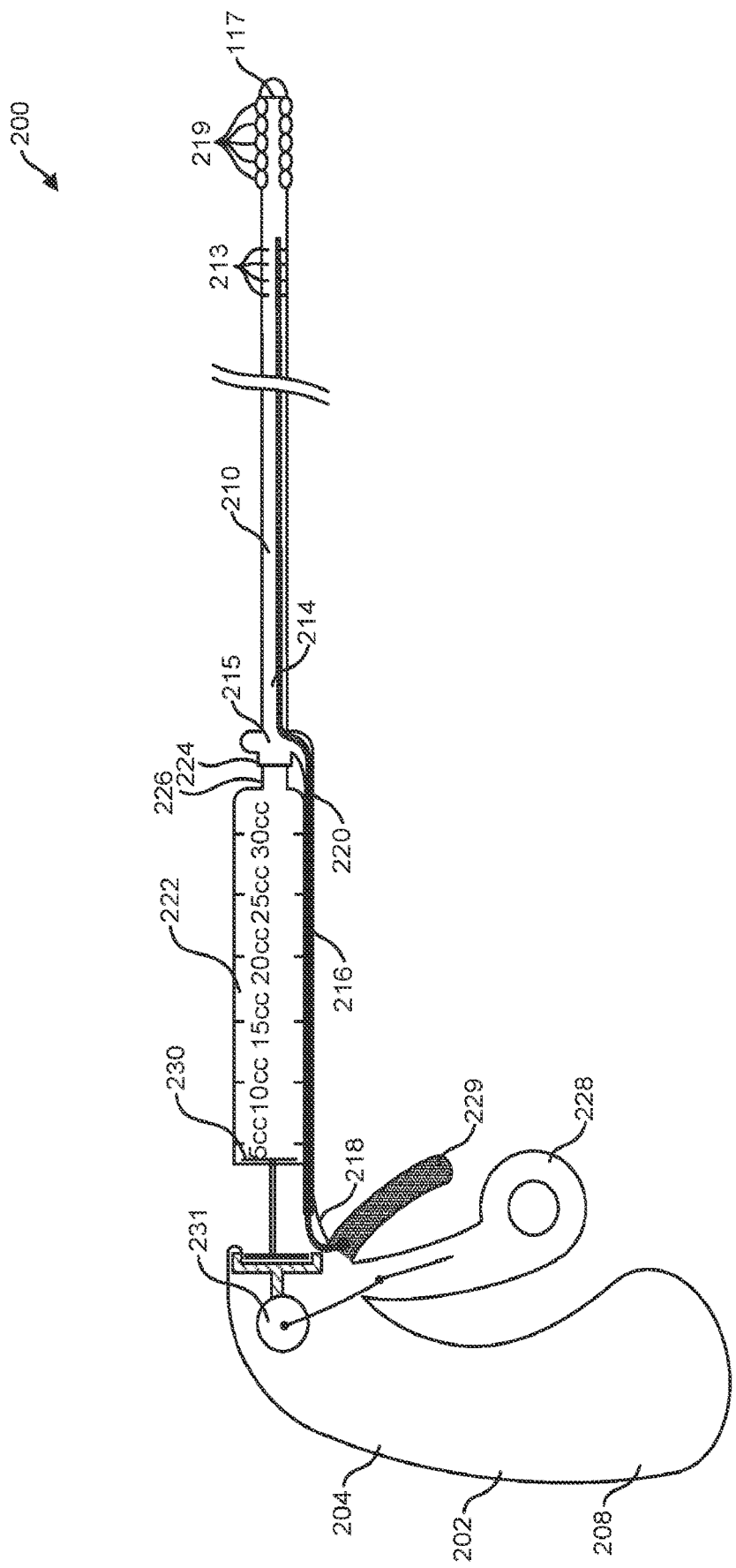
FIG. 19 is a side view of a medical device enclosing a syringe and having an articulating tip in accordance with embodiments of the invention.

Turning to FIG. 19, one embodiment of the invention 200 includes a body 202 defining a syringe cavity 216 having a handle end 218 opposite an arm end 220 and is operable to receive and secure a syringe 222. Markings 213 indicate the depth of the device 200 inside of the patient. The syringe 222 may snap into place in the syringe cavity 216, for example. A lock 224 is disposed at the arm end 220 of the syringe cavity 216 and is operable to receive and secure a tip 226 of the syringe 216. The lock 224 is operable to create a leakproof seal between the lock 224 and the tip 226 of the syringe 222. The lock 224 is further operable to enable fluid communication between the tip 226 of the syringe 222 and a fluid input end 215 of a conduit 214. The handle 208 contains a spring-loaded trigger mechanism 228, such as a finger ring, for example, operable to drive a plunger 230 into the syringe 222 to advance a fluid contained within the syringe 222. In one embodiment, a mechanical driver 231 is operable to drive an internal push pad of the plunger 230 into the syringe 222 and drive a fluid contained within the syringe 222 through the conduit 214, out of a high flow output port 219, and into the uterus and fallopian tubes of a patient. An HSG procedure may utilize 30 cc of dye, for example. An articulating lever 229 is operable to curl the arm 210 in a variety of directions by pulling the articulating lever 229. The medical device 200 may be configured with a variety of tips such as an articulating tip, a balloon, an ensnare tip, a wire, or any other device suitable operable to make an abrasion on the endometrial lining of the patient's uterus.

In accordance with embodiments of the invention, a method for using any of the aforementioned embodiments to perform an endometrial abrasion and/or HSG procedure is provided. The method includes a first step (a) of providing a medical device 5, 100 as defined herein; (b) introducing the medical device 5, 100 into the uterine cavity of the patient prior to ovulation such that the shielding device 79, 140 is securely positioned against the patient's cervical os to provide a leakproof seal for fluids injected into the uterus; (c) injecting a fluid, such as saline or dye, into the patient's uterus to fill the uterus to perform an HSG procedure and remove blockages from the patient's fallopian tubes, and/or (d) using ultrasound or x-ray to view the patient's fallopian tubes and the medical device 5, 100 in the uterus of the patient. In embodiments of the device 5, 100 that include an imaging device, the physician will use an image of the uterus of the patient displayed on the imaging device in step (d) rather than viewing the device by ultrasound or x-ray. The method further includes a step (e) of using the ultrasound, x-ray, or imaging device to position the medical device 5, 100 to perform an endometrial abrasion in a desired location by actuating the articulating tube, a wire, an ensnare tip, or a balloon, as defined herein. The method includes a step (f) 316 of removing the medical device 5, 100 from the patient.

For any of the aforementioned embodiments, part or all of the medical device 100 may be fabricated from a transparent material to enable the physician to view the amount of saline being advanced into the patient. Additionally, markings indicating 5 cc, 10 cc, 15 cc, and 20 cc may be included. This will enable the physician to inject the correct amount of saline to fill the uterus.

For the purposes of promoting an understanding of the principles of the invention, reference has been made to the preferred embodiments illustrated in the drawings, and specific language has been used to describe these embodiments. However, this specific language intends no limitation of the scope of the invention, and the invention should be construed to encompass all embodiments that would normally occur to one of ordinary skill in the art. The particular implementations shown and described herein are illustrative examples of the invention and are not intended to otherwise limit the scope of the invention in any way. For the sake of brevity, conventional aspects of the system (and components of the individual operating components of the system) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical." Numerous modifications and adaptations will be readily apparent to those skilled in this art without departing from the spirit and scope of the present invention.

What is claimed is:
1. A medical device comprising:
an arm having a proximal end and a distal end with an articulating lumen disposed therein and wherein the articulating lumen extends from said proximal end to said distal end,
a handle comprising a trigger and a removable fluid cassette, wherein the removable fluid cassette is disposed within said handle,
an articulating tube comprising a bore extending from a first end to a second end and wherein the articulating tube is disposed within said articulating lumen, an electric pump system comprising a power source and a button, wherein said button is configured to activate said electric pump system, wherein said fluid cassette is in fluid communication with said bore, wherein said electric pump system is operable to pump a fluid from said fluid cassette through said bore, wherein said trigger is operable to extend the second end of said articulating tube beyond said distal end of said arm, wherein said second end of said articulating tube is operable to curl in an upward direction upon exiting the distal end of said arm.

2. The medical device of claim 1, further comprising an optical lumen disposed within said arm, wherein said optical lumen is configured to receive a scope.

3. The medical device of claim 2, comprising the scope with a camera at its distal end, and an imaging device comprising a viewing screen, wherein said imaging device is mountably attached to said handle, wherein said imaging device is in communication with said scope, wherein views from said camera are displayed on said viewing screen.

4. The medical device of claim 1, wherein said articulating tube is made from a material having shape-memory properties.

5. The medical device of claim 1, further comprising a rotator operable to rotate said articulating tube along a longitudinal axis.

6. The medical device of claim 5, further comprising a rotational lock operable to lock the articulating tube in a fixed extended position.

7. The medical device of claim 1, wherein said trigger comprises a channel operable to receive said articulating tube, and wherein said handle and said trigger are molded together by an arched hinged connection operable to flex between a first position and a second position, wherein, in said first position, said trigger is biased away from said handle, wherein, in said second position, said trigger is pulled proximally towards said handle allowing the second end of said articulating tube to extend beyond the distal end of said arm, and wherein said arm is fixedly attached to said trigger.

8. The medical device of claim 1, further comprising a shield operable to sealingly engage an external os of a cervix, said shield comprising a bore configured to slidably engage said arm.

9. A method for performing an abrasion on an endometrial lining of a uterus of a patient, said method comprising the steps of:

providing a medical device comprising:

an arm having a proximal end and a distal end, an articulating tube having a first end and a second end, wherein the articulating tube is disposed within said arm, a handle comprising a trigger and a removable fluid cassette, wherein the removable fluid cassette is disposed within said handle, an electric pump system comprising a power source and a button, wherein said button is configured to activate said electric pump system, wherein said fluid cassette is in fluid communication with said articulating tube, wherein said electric pump system is operable to pump a fluid from said fluid cassette through said articulating tube, wherein said trigger is operable to extend the second end of said articulating tube beyond said distal end of said arm, wherein said second end of said articulating tube is operable to curl in an upward direction upon exiting the distal end of said arm, introducing said arm of said medical device into a uterine cavity of the uterus prior to ovulation, injecting the fluid into the uterus that is operable to be seen by ultrasound or x-ray, guiding the second end of said articulating tube into position along the endometrial lining of the uterus, performing an endometrial abrasion, and removing said medical device.

10. The method of claim 9, further comprising the step of injecting the fluid into the uterus to remove blockages from the patient's fallopian tubes.

* * * * *